US009912226B2

(12) United States Patent
Schinzel et al.

(10) Patent No.: US 9,912,226 B2
(45) Date of Patent: Mar. 6, 2018

(54) METHOD FOR MONITORING A BATTERY, EVALUATION DEVICE, AND MEASURING SYSTEM (71) Applicant: Robert Bosch GmbH, Stuttgart (DE)

(72) Inventors: Mirko Schinzel, Stuttgart (DE); Nils Draese, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/105,940

(22) PCT Filed: Nov. 11, 2014

(86) PCT No.: PCT/EP2014/074273
§ 371 (c)(1),
(2) Date: Jun. 17, 2016

(87) PCT Pub. No.: WO2015/090735
PCT Pub. Date: Jun. 25, 2015

(65) Prior Publication Data
US 2016/0322893 A1   Nov. 3, 2016

(30) Foreign Application Priority Data
Dec. 20, 2013   (DE) .................. 10 2013 226 795

(51) Int. Cl.
*H02M 1/32*   (2007.01)
*H02M 1/088*   (2006.01)
(Continued)

(52) U.S. Cl.
CPC ............ *H02M 1/32* (2013.01); *H02H 7/0844* (2013.01); *H02H 7/1203* (2013.01);
(Continued)

(58) Field of Classification Search
CPC ...... H02M 1/32; H02M 3/1584; H02M 1/088; H02M 2003/1586; H02M 2001/32; H02H 7/1203; H02H 7/0844; H02H 7/1225
See application file for complete search history.

(56) References Cited

U.S. PATENT DOCUMENTS 5,123,746 A * 6/1992 Okado ............... H02M 7/5387
363/37
5,499,186 A   3/1996 Carosa
(Continued)

FOREIGN PATENT DOCUMENTS

DE   102008011597   9/2009
EP   0 431 492   6/1991
WO   WO 2013/139373   9/2013

OTHER PUBLICATIONS

Received STIC search report from EIC 2800 searcher John DiGeronimo on Feb. 15, 2017.*
(Continued)

*Primary Examiner* — Timothy J Dole
*Assistant Examiner* — Htet Z Kyaw
(74) *Attorney, Agent, or Firm* — Norton Rose Fulbright US LLP; Gerard Messina (57) ABSTRACT A circuit system having a voltage converter having an input path, an output path, and having a plurality of phases, each phase having at least one half-bridge and at least one fuse, each branch of the half-bridge having a respective MOSFET. The circuit system recognizes a defective MOSFET and controls the MOSFETs of the intact phases in such a way that a sufficiently large current trips the fuse connected in series with the defective MOSFET in order to enable an emergency operation of the voltage converter. A method for operating such a circuit system is also described.

26 Claims, 4 Drawing Sheets (51) Int. Cl.
  *H02H 7/08* (2006.01)
  *H02H 7/122* (2006.01)
  *H02M 3/158* (2006.01)
  *H02H 7/12* (2006.01)

(52) U.S. Cl.
  CPC .......... *H02H 7/1225* (2013.01); *H02M 1/088* (2013.01); *H02M 3/1584* (2013.01); *H02M 2001/325* (2013.01); *H02M 2003/1586* (2013.01)

(56) References Cited

U.S. PATENT DOCUMENTS

| | | | | |
|---|---|---|---|---|
| 6,222,284 | B1* | 4/2001 | Hammond | H02M 7/49 200/290 |
| 8,743,573 | B2* | 6/2014 | Balpe | H02P 27/08 363/132 |
| 8,848,407 | B2* | 9/2014 | Blomberg | H02M 1/32 323/207 |
| 9,634,587 | B2* | 4/2017 | Kikuchi | B62D 5/0484 |
| 2011/0101952 | A1* | 5/2011 | Lee | H02M 3/1588 323/311 |
| 2011/0260705 | A1* | 10/2011 | Saeki | H02M 3/158 323/299 |
| 2013/0194840 | A1* | 8/2013 | Huselstein | H02M 1/32 363/50 |
| 2015/0054439 | A1* | 2/2015 | Dittmer | H02P 29/022 318/400.21 |
| 2015/0098258 | A1* | 4/2015 | Park | H02M 5/4585 363/37 |

OTHER PUBLICATIONS

International Search Report dated Apr. 2, 2015, of the corresponding International Application PCT/EP2014/074273, filed on Nov. 11, 2014.

* cited by examiner

METHOD FOR MONITORING A BATTERY, EVALUATION DEVICE, AND MEASURING SYSTEM

FIELD

The present invention relates to a circuit system having a voltage converter having an input path, an output path, and having a plurality of phases, each phase having at least one half-bridge and at least one fuse, each branch of the half-bridge having a MOSFET.

The present invention also relates to a method for operating such a circuit system.

BACKGROUND INFORMATION

A circuit system is described, for example, in U.S. Pat. No. 5,499,186 A. The circuit system of this patent shows at least two half-bridges per phase.

In voltage converters, half-bridges made of switches are used in connection with a coil and a capacitor to convert a voltage into a different voltage. By switching a plurality of phases in parallel and controlling them in temporally offset fashion, the result is achieved that the load is reduced on the components, and in addition the ripple current is significantly reduced. In addition, in this way the electromagnetic compatibility is increased, and fewer losses occur, thus improving efficiency. As switches, here in most cases MOSFETs are used, which in case of error generally fail with a short circuit. In the case of a voltage converter having a plurality of phases connected in parallel, the failure of a phase results in the failure of the entire converter.

SUMMARY

An object of the present invention is to enable an emergency operating mode for a multiphase voltage converter that fails due to a short circuit of a MOSFET.

The present invention is based on a circuit system having a voltage converter having an input path, an output path, and having a plurality of phases, each phase having at least one half-bridge and at least one fuse, and each branch of the half-bridge having a MOSFET. In accordance with the present invention, the circuit system has a first switch in the input path of the voltage converter, or also has a second switch in the output path of the voltage converter. Here it may be advantageous that, through the switches, the voltage sources at the input or also at the output of the voltage converter can be separated. In this way, an uncontrolled flow of current can be avoided on the one hand, and on the other hand in this way it is possible that, through a specific controlling of the MOSFETs of the individual phases, the fuse of the defective phase can be tripped in a targeted manner. As a result, the voltage converter can then be operated in an emergency operating mode.

An advantageous embodiment of the present invention provides that a fuse is situated in each branch of the half-bridge. Here it is advantageous that the fuses, due to their inherent resistance, present a kind of resistive symmetrization of the individual half-bridges. In addition, in this way the so-called free-burning factor, i.e., the ratio between the available current in the phase having the defective MOSFET and the tolerable nominal current, is increased. In this way, the fuses can be designed for a higher current at which they are to trip, thus reducing losses in normal operation.

According to an advantageous embodiment of the present invention, it is provided that the MOSFET is connected to the fuse at the drain side. Here it is advantageous that after the fuse has tripped, the remaining phases having intact MOSFETs can again be put into operation.

According to a further advantageous embodiment of the present invention, it is provided that the MOSFET is connected to the fuse at the source side. Here it is advantageous that after the fuse has tripped it is still possible to supply the defective MOSFET with a free-burning current. This then takes place from the drain terminal to the gate terminal, and makes it possible that, through additional measures, the gate can also be burned free, in order subsequently to enable an emergency operating mode with all phases.

In an advantageous specific embodiment, it is provided that the circuit system is set up so that the MOSFET is controlled by a driver circuit via a series resistance, and a supply voltage for the driver circuit is secured against an excess current. Here it is advantageous that, in the case of a defective MOSFET, only the driver circuit belonging to this MOSFET can be destroyed, and not the driver circuits of the remaining intact phases.

In a further advantageous specific embodiment, it is provided that a connection between the driver circuit and a regulating unit for the driver circuit has a series resistance in order to secure the regulating unit against an excess current. Here, it may be advantageous that in the case of a defective MOSFET the regulating unit is protected from being destroyed by an excess current from the driver circuit.

An advantageous specific embodiment provides that the circuit system is set up such that the MOSFET is controlled by a driver circuit via a series resistance, and that a protective circuit is situated between the driver circuit and the series resistance, the protective circuit having a parallel circuit of a first resistor and a capacitor. Here, it may be advantageous that through the protective circuit the driver circuit of the defective phase is protected against excessively high direct currents which could otherwise destroy the driver circuit.

A further advantageous specific embodiment provides that a current bleed circuit is situated between a connection of the series resistance to the protective circuit and ground, the current bleed circuit having an additional switch that can be controlled via a regulating unit. Here, it may be advantageous that via the additional switch the current from the short-circuited gate of the defective MOSFET can be bled to ground. This very quickly overloads the series resistance, causing it to melt, and thus separating the gate conductor.

According to an advantageous embodiment, it is provided that the current bleed circuit has a diode per protective circuit, the diode being situated between the connection of the series resistance to the protective circuit and the additional switch, and the diode being connected at the cathode side to the additional switch. Here, it may be advantageous that only a single additional switch per phase is necessary, with which the series resistance of the defective MOSFET can be burned free. Moreover, per phase only a single additional switch has to be controlled by the regulating unit. This has the result that fewer components are required, saving costs and space.

According to a further advantageous embodiment, it is provided that a second resistance is situated between the additional switch and ground. Here, it may be advantageous that the second resistance acts as a current feedback, and thus presents a constant current source enabling the gate to be burned free with a defined power level. This has the result that the additional switch can be designed specifically for this power level.

Moreover, the present invention relates to a method for operating a circuit system. According to an example embodiment of the present invention, in an abnormal operating state the following method steps are carried out:

A: recognition of a defect of a low-side MOSFET or of a defect of a high-side MOSFET in a branch of a half-bridge of a phase;
B: stopping the controlling of all MOSFETs;
C: opening the second switch when there is a defect of the low-side MOSFET, or opening the first switch when there is a defect of the high-side MOSFET;
D: controlling the MOSFETs of the phases in which all MOSFETs are intact, in such a way that a current flows in the defective phase that is sufficiently large to trip the fuse.

Here, it may be advantageous that, through the named sequence of method steps, a fuse in a phase having a short-circuited MOSFET can be burned free in a targeted manner. In addition, through method steps B and C the voltage converter can be put out of operation and protected against an uncontrolled flow of current, so that destruction of components can be avoided.

An advantageous embodiment of the method according to the present invention provides that after method step D there follows a method step E in which the opened first switch or the opened second switch is closed, and in which the MOSFETs of the phases in which all MOSFETs are intact are controlled as in a normal operating state. Here, it may be advantageous that the voltage converter having a plurality of phases connected in parallel can be operated in an emergency operating mode, the defective phase being no longer operated.

An advantageous embodiment of the method according to the present invention provides that after method step D there follows a method step F in which the additional switch is closed. Here, it may be advantageous that through the closing of the additional switch the current that flows in the short-circuited MOSFET is bled to ground via the series resistance of the gate of the MOSFET. In this way, the series resistance of the gate is overloaded and melts. The MOSFET is thus separated from the circuit system by two of three connections.

According to an advantageous embodiment of the method according to the present invention, it is provided that after method step F there follows a method step G in which the opened first switch or the opened second switch is closed, and in which the MOSFETs of all phases are controlled, the phase having the defect being operated at a lower power level than in normal operation, and the phases in which all MOSFETs are intact being operated as in normal operation. Here, it may be advantageous that the voltage converter having a plurality of phases connected in parallel can be operated in an emergency operating mode in which all phases can be used.

DETAILED DESCRIPTION OF EXAMPLE EMBODIMENTS

Figure 1:
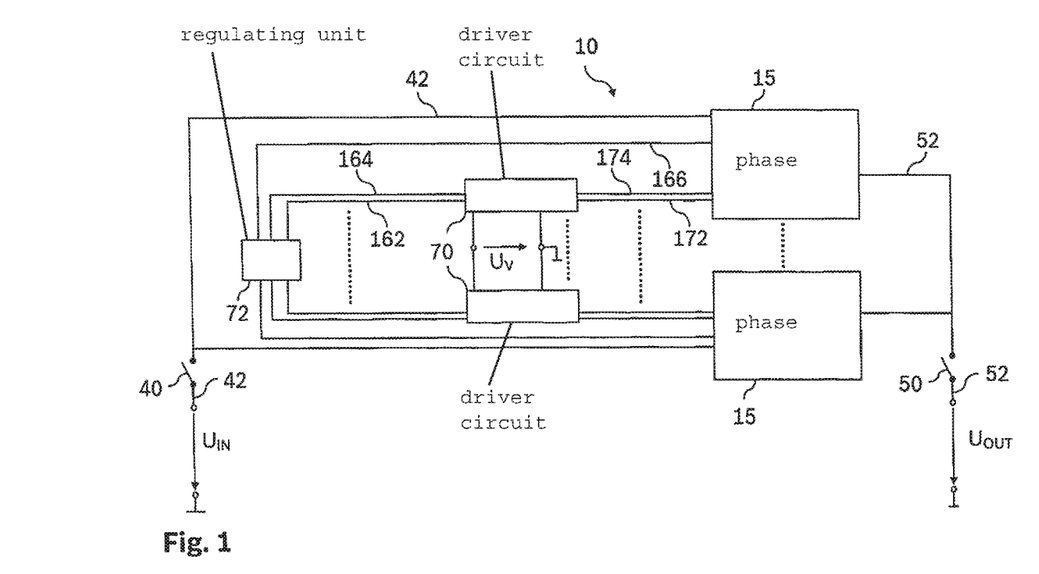
FIG. 1 shows a first exemplary embodiment of a circuit system according to the present invention.

FIG. 1 shows a first exemplary embodiment of a circuit system according to the present invention. Shown is a circuit system that has an input voltage $U_{IN}$ and an output voltage $U_{OUT}$. Voltage converter 10 converts input voltage $U_{IN}$, using phases 15 connected in parallel, into output voltage $U_{OUT}$, input voltage $U_{IN}$ being made available to phases 15 via an input path 42 having a first switch 40, and output voltage $U_{OUT}$ being picked off from phases 15 via an output path 52 having a second switch 50. In addition, the circuit system has a regulating unit 72, as well as a respective driver circuit 70 per phase 15. Regulating unit 72 is connected to driver circuits 70 via lines 162 and 164, and is connected to phases 15 via a respective line 166. Driver circuits 70 are connected to phases 15 via lines 172 and 174, and are supplied with power by a supply voltage $U_v$. In a normal operating state, first switch 40 and second switch 50 are closed. Regulating unit 72 then sends a first and a second pulse-width-modulated signal to driver circuits 70 via lines 162 or 164. The pulse-width-modulated signals run in push-pull operation to one another, the first signal in line 162 being processed by driver circuit 70 so as to control, via line 172, low-side MOSFETs 32 in phases 15 according to FIG. 2, and the signal in line 164 being processed by driver circuit 70 so as to control, via line 174, high-side MOSFETs 34 in phases 15 according to FIG. 2. Driver circuits 70 are controlled in temporally offset fashion by regulating unit 72 during a switching cycle.

Figure 2:
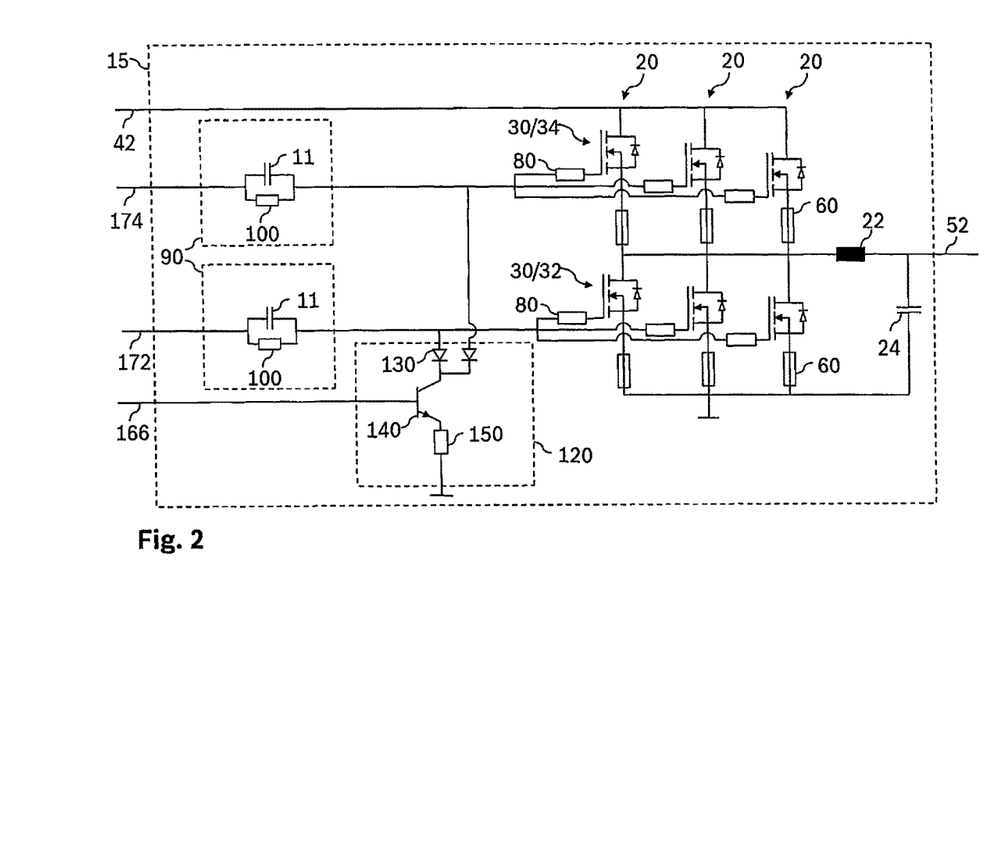
FIG. 2 shows a phase of the voltage converter of the first exemplary embodiment according to FIG. 1.

In an alternative exemplary embodiment not shown graphically, supply voltage $U_v$ is secured against excess current from one of the driver circuits 70. In this way, damage to driver circuits 70 of all phases 15 due to an excess current flowing in a driver circuit 70 in one of the phases 15 can be avoided. Alternatively, the supply voltage can also be made switchable. In a further alternative, a series resistance is situated between regulating unit 72 and driver circuit 70. In this way, regulating unit 72 can be protected against an excess current from one of the driver circuits 70. In these alternative specific embodiments, protective circuit 90 and current bleed circuit 120, shown in FIG. 2, are then not necessary. However, care must be taken that in these cases phase 15 having defective MOSFET 30 can no longer be operated, because driver circuit 70 of this phase 15 will presumably be destroyed.

FIG. 2 shows a phase of the voltage converter of the first exemplary embodiment according to FIG. 1. Shown is a phase 15 having three half-bridges 20 connected in parallel, which together with a coil 22 and a capacitor 24 form a synchronous converter. The branches of half-bridges 20 each have a MOSFET 30, and, at the drain side, also each have a fuse 60. Coil 22 is connected on the one hand to the center taps of half-bridges 20 and on the other hand to output path 52. Capacitor 24 is situated between output path 52 and ground GND. In addition, the half-bridges are connected at the input side to input path 42. Among the MOSFETs 30, a distinction is made between low-side MOSFETs 32 and high-side MOSFETs 34, the low-side MOSFETs 32 being situated between the center tap of half-bridges 20 and ground GND, and the high-side MOSFETs 34 being situated between the center tap of half-bridges 20 and input path 42. The gates of high-side MOSFETs 34 are controlled via line 174. The gates of the low-side MOSFETs are controlled via line 172. In addition, a respective protective circuit 90 is situated at high-side MOSFETs 34, and a protective circuit 90 is situated at the low-side MOSFETs, and one series resistance 80 per MOSFET 30 is situated in lines 172 and 174. Protective circuit 90 is a parallel circuit of a first resistance 100 and a capacitor 110. In addition, phase 15 has a current bleed circuit 120 that is situated between the connection of series resistances 80 to protective circuit 90 and ground GND. Current bleed circuit 120 has an additional switch 140, a second resistance 150, and a respective diode 130 per protective circuit 90. Here, diode 130, additional switch 140, and second resistance 150 are connected in series, each diode 130 being connected at the cathode side to additional switch 140 and at the anode side to the connection between protective circuit 90 and series resistance 80, and additional switch 140 being connected to ground GND via second resistance 150. Additional switch 140 is controlled via line 166.

In an alternative exemplary embodiment, not shown graphically, fuses 60 in each branch of half-bridges 20 are connected at the drain side to the MOSFETs. In this way, in the case of a defective MOSFET it is not also necessary to burn free the gate in order to make it possible to set the phases 15 having intact MOSFETs 30 back into operation. In a further alternative exemplary embodiment, no second resistance 150 is situated in current bleed circuit 120. As a result, the current feedback is omitted, and thus additional switch 140 has to be a safe FET, a small-signal end stage, or a simple MOSFET that can drive a sufficiently large current.

Figure 3:
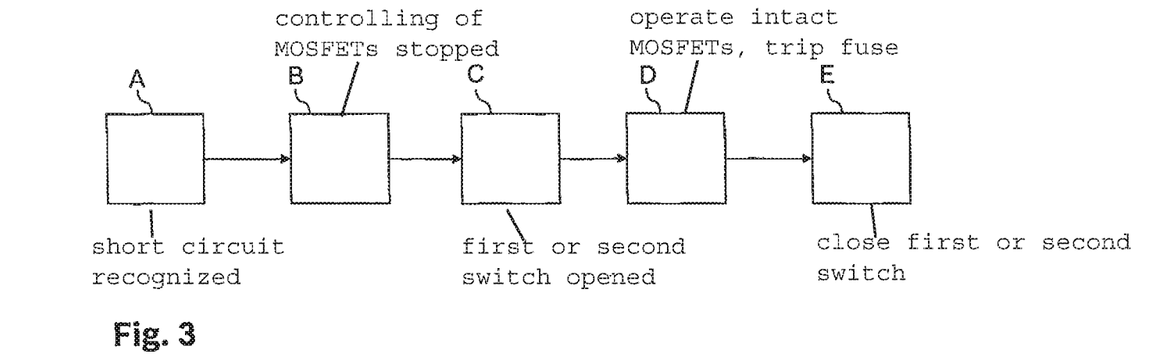
FIG. 3 shows a first exemplary embodiment of an operating method according to the present invention of the circuit system according to the present invention.

FIG. 3 shows a first exemplary embodiment of an operating method according to the present invention for the circuit system according to the present invention. Thus, in a method step A, it is recognized if a low-side MOSFET 32 or a high-side MOSFETs 34 has a short circuit. As soon as this is recognized, then in a method step B the controlling of all MOSFETs 30 is stopped in order to place the voltage converter out of operation. Subsequently, in a method step C either second switch 50 is opened, if a defective low-side MOSFET 32 was recognized, or first switch 40 is opened, if a defective high-side MOSFET 34 was recognized. In this way, an uncontrolled flow of current during a subsequent method step D is avoided. In method step D phases 15 having intact MOSFETs 30 are operated in such a way that a current flows into phase 15, having the defect, that is sufficiently large to trip fuse 60. The sufficiently large current is enabled by a controlling of phases 15 in which all MOSFETs 30 are intact with a low pulse-duty factor. As soon as fuse 60 has tripped, situated in the branch of half-bridges 20 having MOSFET 30 that has the defect, a method step E is carried out. In this method step E, first switch 40 or second switch 50 is closed, and subsequently MOSFETs 30 of phases 15 in which all MOSFETs 30 are intact are controlled as in normal operation. In this way, an emergency operating mode of the circuit system is achieved in which phase 15 having defective MOSFET 30 is not set back into operation.

Figure 4:
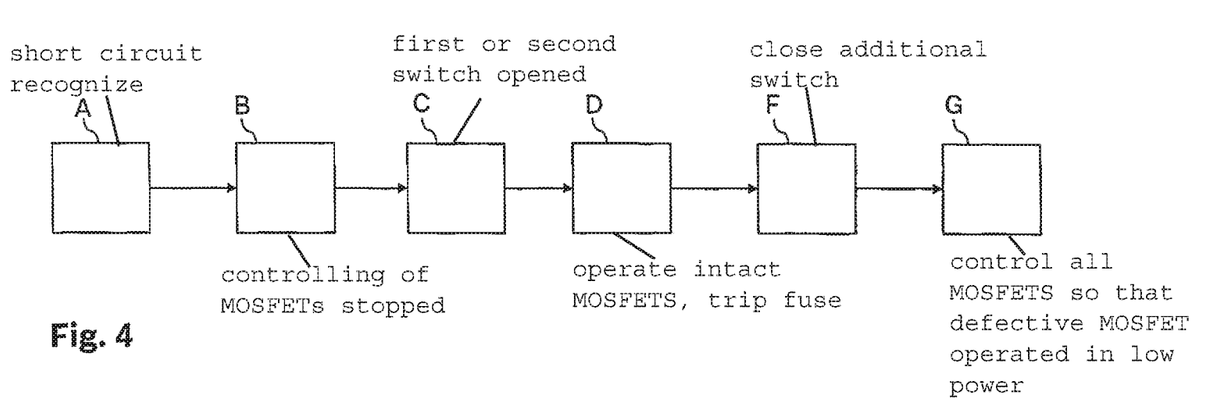
FIG. 4 shows a second exemplary embodiment of an operating method according to the present invention of the circuit system according to the present invention.

FIG. 4 shows a second exemplary embodiment of an operating method according to the present invention of the circuit system according to the present invention. Shown are method steps A through G, which are executed in succession. Here, method steps A through D are identical to the method steps having the same designations from FIG. 3. Following method step D, in which fuse 60 in the branch of half-bridge 20 having defective MOSFET 30 has tripped, a method step F is carried out. In this method step F, additional switch 140 is closed, which is controlled via line 166 by regulating unit 72. In this way, the current flowing in the phase having defective MOSFET 32 now flows to ground GND via the gate of defective MOSFET 30, its series resistance 80, and subsequently via additional switch 140 in current bleed circuit 120. Due to the current, series resistance 80 is overloaded, melts, and thus separates the connection between the gate of defective MOSFET 30 and driver circuit 70. As soon as this has happened, a further method step G is carried out. Here, all phases 15 are controlled, i.e., including phase 15 having MOSFET 30 having the defect. The controlling of MOSFETs 30 takes place in such a way that the phase 15 having defective MOSFET 30 is operated at a lower power level than in normal operation, and the rest of the phases are operated as in normal operation. In this way, the circuit system can be operated in an emergency operating mode that uses all phases 15.

In an alternative exemplary embodiment not shown graphically, method step F of FIG. 4 can also be followed by method step E of FIG. 3. In this way, an emergency operating mode can be enabled even if driver circuit 70 of phase 15 having defective MOSFET 30 is no longer capable of functioning.

A basic presupposition for the circuit system and the associated method for operating this circuit system is that voltage converter 10 has at least three phases 15 having at least one half-bridge 20 per phase 15, or has at least two phases 15 having at least two half-bridges 20 per phase 15. This is necessary in order to obtain a sufficiently large free-burning factor in order to trip fuse 60 in the branch of half-bridge 20 having defective MOSFET 30.

What is claimed is:
1. A circuit system, comprising:
a voltage converter that includes:
an input path;
an output path;
a plurality of phases, wherein each of the plurality of phases includes a fuse and a half-bridge that includes a MOSFET; and
at least one of: i) a first switch in the input path of the voltage converter and ii) a second switch in the output path of the voltage converter;
wherein the circuit system is configured to respond to occurrence of a fault in one of the plurality of phases by:
opening the first switch or the second switch; and
while the first switch or the second switch is opened, operating at least one of the others of the plurality of phases to flow through the phase in which the fault has occurred a current that trips the fuse of the phase in which the fault has occurred.
2. The circuit system as recited in claim 1, wherein:
the half-bridge includes a plurality of branches;
the MOSFET includes a plurality of MOSFETs;
the fuse includes a plurality of fuses;
the plurality of MOSFETs include a respective MOSFET in each of the branches of the half bridge; and
the plurality of fuses include a respective fuse in each of the branches of the half-bridge.
3. The circuit system as recited in claim 2, wherein a drain side of each of the MOSFETs is connected to a respective one of the fuses.
4. The circuit system as recited in claim 2, wherein a source side of each of the MOSFETs is connected to a respective one of the fuses.

5. The circuit system as recited in claim 2, wherein the fault is due to a defect in one of the MOSFETs and the tripping is of the fuse that is in the branch that includes the MOSFET that is defective.

6. The circuit system as recited in claim 1, wherein:
the MOSFET includes a high-side MOSFET and a low-side MOSFET;
the voltage converter includes the first switch and the second switch;
the circuit system is configured so that the opening is of the first switch when the fault occurs in the high-side MOSFET and is of the second switch when the fault occurs in the low-side MOSFET.

7. The circuit system as recited in claim 6, wherein the circuit system is configured to, in response to the occurrence of the fault, after the fuse trips, close the switch that had been opened in response to the occurrence of the fault.

8. The circuit system as recited in claim 1, wherein the circuit system is configured to, in response to the occurrence of the fault, after the fuse trips, close the switch that had been opened in response to the occurrence of the fault.

9. The circuit system as recited in claim 1, wherein the circuit system is configured to, in response to the occurrence of the fault, stop control of the MOSFETs of all of the phases prior to the opening of the first or second switches.

10. A circuit system comprising:
a voltage converter that includes:
an input path;
an output path;
a driver circuit;
at least one of: i) a first switch in the input path of the voltage converter and ii) a second switch in the output path of the voltage converter; and
a plurality of phases, wherein:
each of the plurality of phases includes a fuse and a half bridge that includes a MOSFET that is controlled by the driver circuit via a series resistance, and
a supply voltage for the driver circuit is secured against an excess current.

11. The circuit system as recited in claim 10, wherein a connection between the driver circuit and a regulating unit for the driver circuit has another series resistance in order to secure the regulating unit against an excess current.

12. A circuit system comprising:
a voltage converter that includes:
an input path;
an output path;
a driver circuit;
at least one of: i) a first switch in the input path of the voltage converter and ii) a second switch in the output path of the voltage converter; and
a plurality of phases, wherein:
each of the plurality of phases includes a protective circuit, a fuse, and a half bridge that includes a MOSFET that is controlled by the driver circuit via a series resistance; and
the protective circuit is situated between the driver circuit and the series resistance and includes a parallel circuit of a first resistance and a capacitor.

13. The circuit system as recited in claim 12, wherein a current bleed circuit is situated between ground and a connection of the series resistance and protective circuit, the current bleed circuit having an additional switch that is controllable via a regulating unit.

14. The circuit system as recited in claim 13, wherein the current bleed circuit has a diode situated between a connection of the series resistance to the protective circuit and the additional switch, and a cathode side of the diode is connected to the additional switch.

15. The circuit system as recited in claim 14, wherein a second resistance is situated between the additional switch and ground.

16. The circuit system as recited in claim 14, wherein:
the half bridge includes a high-side MOSFET and a low-side MOSFET;
the series resistance includes a first series resistance and second series resistance;
the protective circuit includes a first protective circuit connected to the high-side MOSFET via the first series resistance and a second protective circuit connected to the low-side MOSFET via the second series resistance;
the diode includes (a) a first diode situated between the additional switch and a connection of the first series resistance to the first protective circuit and (b) a second diode situated between the additional switch and a connection of the second series resistance to the second protective circuit; and
the cathode side of each of the first and second diodes is connected to the additional switch.

17. The circuit system as recited in claim 12, wherein:
the half-bridge includes a plurality of branches;
the MOSFET includes a plurality of MOSFETs;
the fuse includes a plurality of fuses;
the plurality of MOSFETs include a respective MOSFET in each of the branches of the half bridge; and
the plurality of fuses include a respective fuse in each of the branches of the half-bridge.

18. The circuit system as recited in claim 17, wherein a source side of each of the MOSFETs is connected to a respective one of the fuses.

19. A method for operating a circuit system in an abnormal operating state, the circuit system including a voltage converter, the voltage converter including an input path, an output path, a first switch in the input path, a second switch in the output path, and a plurality of phases, wherein each of the plurality of phases includes a fuse and a half-bridge that includes a high-side MOSFET and a low-side MOSFET, the method comprising:
(A) recognizing a defect of a low-side MOSFET or a defect of a high-side MOSFET in a half-bridge of one of the plurality of phases;
(B) stopping controlling of all MOSFETs;
(C) opening the first switch or the second switch, wherein the opening is performed according to a condition that the second switch is the switch that is opened when the recognized defect is of the low-side MOSFET and the first switch is the switch that is opened when the recognized defect is of the high-side MOSFET; and
(D) controlling the MOSFETs of the others of the plurality of phases in which all MOSFETs are intact in such a way that, in the phase having the defect, a current that is sufficiently large to trip the fuse flows.

20. The method as recited in claim 19, further comprising:
after the method step (D), (E) closing the opened first switch or the opened second switch controlling the MOSFETs of the phases in which all MOSFETs are intact as in a normal operating state.

21. The method as recited in claim 19, further comprising:
after the method step (D), (E) closing an additional switch is closed.

22. The method as recited in claim 21, further comprising:
after the method step (E), (F) closing the opened first switch or the opened second switch, and controlling the MOSFETs of all phases, wherein, in the controlling of step (F), the phase having the defect is operated with a lower power level than in a normal operating state and the phases in which all MOSFETs are intact are operated as in the normal operating state.

23. A circuit system, comprising:
a voltage converter that includes:
an input path;
an output path;
at least one of: i) a first switch in the input path of the voltage converter and ii) a second switch in the output path of the voltage converter; and
a plurality of phases, wherein:
each of the plurality of phases includes a fuse, a half-bridge that includes a MOSFET, and a current bleed circuit that includes an additional switch; and
the circuit system is configured to respond to an occurrence of a fault in one of the plurality of phases with a responsive action that includes closing the additional switch so that current flowing through the phase in which the fault occurred flows to ground via the closed additional switch of the current bleed circuit.

24. The circuit system as recited in claim 23, wherein:
the voltage converter includes at least one of: i) a first switch in the input path of the voltage converter and ii) a second switch in the output path of the voltage converter; and
the responsive action further includes:
opening the first switch or the second switch; and
while the first switch or the second switch is opened, operating at least one of the others of the plurality of phases to flow through the phase in which the fault has occurred a current that trips the fuse of the phase in which the fault has occurred.

25. The circuit system as recited in 24, wherein the responsive action further includes stopping control of the MOSFETs of all of the phases prior to the opening of the first or second switches and restarting control of all of the MOSFETs of all of the phases, including the phase in which the fault occurred, after the additional switch is closed.

26. The circuit system as recited in claim 23, wherein the fault is due to a defect in the MOSFET of the phase in which the fault occurred, and the flow of current to ground is via a gate of the defective MOSFET.

* * * * *

UNITED STATES PATENT AND TRADEMARK OFFICE
CERTIFICATE OF CORRECTION

PATENT NO. : 9,912,226 B2
APPLICATION NO. : 15/105940
DATED : March 6, 2018
INVENTOR(S) : Mirko Schinzel and Nils Draese It is certified that error appears in the above-identified patent and that said Letters Patent is hereby corrected as shown below:

On the Title Page

Item (54) and in the Specification, Column 1, Lines 1-3, Change "METHOD FOR MONITORING A BATTERY, EVALUATION DEVICE, AND MEASURING SYSTEM" to --CIRCUIT SYSTEM FOR EMERGENCY OPERATION OF A MULTIPHASE VOLTAGE CONVERTER BY MEANS OF SPECIAL OPERATING METHODS--

Signed and Sealed this
Third Day of July, 2018

Andrei Iancu
*Director of the United States Patent and Trademark Office*